United States Patent [19]
Lehmann

[11] 3,900,860
[45] Aug. 19, 1975

[54] PHOTOGRAPHIC CAMERA AND FLASH LAMP SELECTION SYSTEM

[75] Inventor: Walter G. Lehmann, Somerville, Mass.

[73] Assignee: Polaroid Corporation, Cambridge, Mass.

[22] Filed: Dec. 26, 1973

[21] Appl. No.: 427,812

[52] U.S. Cl. ............. 354/126; 240/1.3; 315/241 P
[51] Int. Cl. .......................................... G03b 15/03
[58] Field of Search .......... 354/126, 127, 128, 143, 354/147; 240/1.3; 315/241 P

[56] References Cited
UNITED STATES PATENTS

| | | |
|---|---|---|
| 3,430,545 | 3/1969 | Wick .............................. 354/127 R |
| 3,438,315 | 4/1969 | Goshima et al. ................ 354/143 R |
| 3,518,487 | 6/1970 | Tanaka et al. .................. 354/143 X |
| 3,608,451 | 9/1971 | Kelem ............................ 354/143 R |
| 3,619,715 | 11/1971 | Kim ................................ 354/143 X |

Primary Examiner—Robert P. Greiner
Attorney, Agent, or Firm—John W. Ericson

[57] ABSTRACT

A photographic camera and multi-flash arrangement therefor in which a multiplicity of linearly arrayed flash lamps mounted in a cartridge, wherein one or more of said lamps may be inoperative, may be automatically and sequentially sampled and the operative ones of said lamps automatically selected for effecting a photographic exposure.

44 Claims, 2 Drawing Figures

PATENTED AUG 19 1975

3,900,860

PHOTOGRAPHIC CAMERA AND FLASH LAMP SELECTION SYSTEM

BACKGROUND OF THE INVENTION

This invention relates generally to photographic apparatus employing means for artificially illuminating a scene to be photographed and, more particularly, to photographic apparatus employing means for automatically selecting operative flash lamps, from an array comprising both operative and inoperative flash lamps, for effecting a photographic exposure.

Photographic flash systems in which a plurality of flash lamps are assembled within a disposable mounting have been favorably received by the consuming public. Certain of these mountings are fashioned as a cubic package in which four flash lamps and associated reflectors face outwardly through four surfaces of the cubic form and have come to be known as "flashcubes". The surfaces are moved sequentially into a flash illuminating orientation by a mechanical rotation assembly coupled with an exposure mechanism of a camera. Sequential switching between the flash lamps within the cube is accomplished as an adjunct to the mechanical rotation of the lamp mounting. Should an inoperative flash lamp be encountered in the course of taking flash illuminated photographs with the cube, the attempted exposure will be aborted, usually with an attendant loss of a frame of film.

In another multiple flash lamp arrangement, a plurality of flash lamps are mounted as an array within a singular disposable package. Typically, these units include a base member which supports a coplanar array of flash lamps and individual lamp reflectors behind each lamp. The lamps may be arranged in a single row, i.e., a linear array, or in other embodiments may be disposed in two or more interdigitated or parallel rows. The base member is adapted to be connected to a socket on the camera which aligns all of the lamps on the array in a diraction such that their light output is substantially parallel with the optical axis of the camera's objective lens. The base member generally includes an insulating terminal board which supports a plurality of thin film conductive paths that are connected at one end to the lamp filament wires. Generally, there is one common conductive path to which one end of all of the lamp filaments are connected. The opposite end of the lamp filaments are each connected to their own individual conductive path. Accordingly, contact to any lamp in the array may be made by making contact simultaneously to the common path and the individual paths.

Linearly arranged multiple flash lamp arrays such as described above have come to be known as "Flash-Bars" and in operation all of the lamps are oriented for providing scene illumination when ignited without recourse to moving or rotating either the flash lamps or their mountings between exposures. Examples of the type of multi-lamp flash units broadly described above may be found in U.S. Pat. Nos. 3,598,984 issued to Slomski and 3,598,985 issued to Harnden et al. on Aug. 10, 1971. Since no relative movement of the flash lamps is involved between exposures, switching systems are required to cause synchronous igniting of individual bulbs with each actuation of a photographic exposure system. Generally, firing circuits are provided which sequentially ignite the bulbs in a predetermined order from first to last with each actuation of a flash shutter synchronization switch. For example, U.S. Pat. No. 3,608,451, issued to Kelem on Sept. 28, 1971, discloses the use of a multi-contact switch having a rotary contact wiping member. The common lamp terminal is connected to one electrode of a battery within the camera. The individual lamp terminals are each connected to a separate contact on the switch. The contact wiping member is connected to the other battery electrode through a normally open flash ignition switch. After one lamp has been ignited, the flash lamp ignition switch is reopened and the contact wiping member is rotated one station to connect the next lamp in the array to the flash firing circuit.

In another arrangement, Goshima et al. in U.S. Pat. No. 3,438,315, issued on Apr. 15, 1969, discloses a multi-flash arrangement for cameras in which a plurality of flashbulbs can be either automatically or manually connected to a firing circuit. The firing circuit includes a battery and capacitor, a flash synchronizing contact, and a mechanical switch arm. The switch arm connects each of the flashbulbs sequentially to the firing circuit and is adapted for automatically switching as the film advances or for manual selection of the flashbulbs by a selector switch on the face of the camera.

A variety of other sequencing circuits for firing flashbulbs in successional order have been proposed. In one category of these circuits, sensing elements are arranged to respond to the heat or light output of an igniting flashbulb by varying either a mechanical or electrical parameter. Following this parameter variation, the circuits enable or arm select lamps within an array for successive firing. In most cases, however, such sequencing devices are either self-destructing when used or require excessive packaging volumes for camera mounted applications. Additionally, the systems are incapable of bypassing any inoperative flashbulbs which may be present in an array.

In still another arrangement, a cascading assembly of electrical resistors of the like is selectively coupled within a grouping of flash lamp circuits. During operation, lamp igniting currents are selectively attenuated to cause the flash lamps within the circuits to be fired in succession. In addition, to being somewhat insensitive to any variations in power supply or circuit performance, this form of successive system is also incapable of bypassing inoperative flash lamps within an array and must rely on an open circuit condition at the terminals of any expended lamp to continue a lamp sequencing function.

In U.S. Pat. No. 3,618,492, issued to Ellin on Nov. 9, 1971, a photographic flash exposure system is described which is operative to sequentially ignite individual lamps within an array of flash lamps. The system automatically passes a monitoring current through each of the flash lamps during each exposure cycle to derive alignment signals which function to align a flash lamp sequencing circuit to bypass inoperative flash lamps. The Ellin device, while workable, provides a system of complex electronic networks and it is both difficult of manufacture and expensive.

SUMMARY OF THE INVENTION

The present invention is addressed to a flash lamp selecting system for use in conjunction with a photographic camera operable to effect photographic exposures in both an ambient illumination and photoflash lamp illumination mode. A plurality of electrical contacts are fixedly disposed within a photographic camera and each of said contacts is electrically connected to one terminal of a discrete one of a plurality of photoflash lamps when a flash lamp array is appropriately inserted into a socket assembly provided on the camera. The other terminals of each of said flash lamps are electrically connected via a common path (upon insertion of the lamp array into the socket assembly aforesaid) to the negative terminal of a battery power supply.

The positive terminal of the battery is serially connected through a resistor to a rotary wiper arm connected within the camera and adapted to rotate past and successively engage each of the electrical contacts aforesaid.

A capacitor is connected in parallel across the serially connected battery and resistor so that the capacitor will be connected across the terminals of the particular flash lamp corresponding to the electrical contact engaged by the rotary wiper arm.

An additional standby electrical contact is provided within the camera and is not connected to any of the flash lamps. The standby contact merely serves as a resting position for the rotary wiper arm. The rotary wiper arm is connected via a shaft through a spring motor to a control knob disposed on the outside of the photographic camera. A pawl assembly is disposed within the camera and is operatively connected to the shutter actuator button and to a ratchet wheel which is fixedly secured to the shaft.

In operation, the control knob is rotated counterclockwise to wind up the spring motor and the rotary wiper arm is initially secured at the standby contact by means of the pawl and ratchet assembly. At this time, the battery will charge up the capacitor through the resistor to a condition sufficient to ignite one of the photoflash lamps at the appropriate time.

Upon depression of the shutter release button, the pawl will disengage the ratchet wheel permitting the shaft to be rotated in a clockwise direction by the spring motor causing the rotary wiper assembly to successively engage each of the plural electrical contacts connected to each of the flash lamps. The rotary wiper will continue its clockwise travel until it has returned to the standby contact at which time the pawl (which has meanwhile been released by the release of the shutter actuator button) will have returned to its initial position and will engage the ratchet wheel. As the rotary wiper successively contacts each of the plurality of electrical contacts, it will complete the electrical path between the junction of the capacitor and the resistor and the terminal of the flash lamp connected to the electrical contact such that the first operative flash lamp will fire and the capacitor will discharge therethrough. Upon reaching the next electrical contact after that corresponding to an operative flash lamp, the corresponding flash lamp to this successive electrical contact will not fire even if operative because there will be insufficient electrical energy remaining in the capacitor to effect such firing. Furthermore, the resistor serially connected with the battery will effect a drop in the potential at the junction of the capacitor and resistor to a level insufficient to fire an operative flash lamp until the capacitor has recharged from the battery. Thus, should the first lamp in the array be operative, then it will immediately fire when the wiper engages its corresponding contact and none of the remaining lamps will be energized even though they all be operative when the wiper successively engages their corresponding electrical contacts. Thus, only one flash lamp may be fired during each rotation of the wiper arm and only the first operative flash lamp encountered by the wiper arm will be fired.

Accordingly, it is an object of the present invention to provide a new and improved, easily fabricated, and low-cost mechanism for automatically and sequentially sampling each of the lamps in an array of lamps and selectively igniting an operative one of said lamps during each photographic exposure.

Another object of the present invention is to provide an improved electromechanical mechanism for automatically selecting operative flash lamps from amongst an array of operative and inoperative flash lamps.

Still another object of the present invention resides in the provision of means for use with a photographic camera operable in a photoflash mode for preventing the abort of a photographic cycle due to the presence of an inoperative flash lamp in an array of flash lamps connected to the camera.

DESCRIPTION OF THE DRAWINGS

Other objects and many of the attendant advantages of the instant invention will be better appreciated and said invention will become clearly understood by reference to the following detailed description when considered in conjunction with the accompanying drawings illustrating one embodiment of the instant invention, wherein.

DETAILED DESCRIPTION OF THE INVENTION

Figure 1:
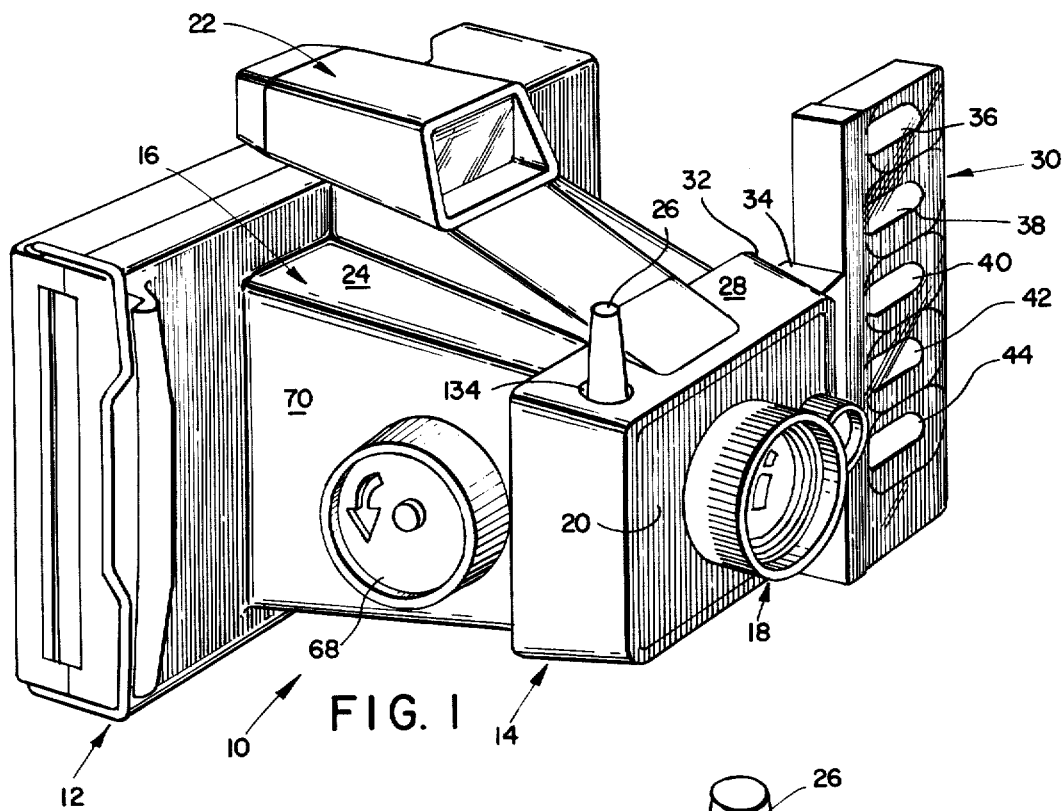
FIG. 1 provides a simplified perspective of a photographic camera employing the subject invention.

Referring to the drawings in more detail, and more particularly to FIG. 1, a photographic camera is illustrated generally at 10 and is seen to include a back portion 12 for receiving a film cassette (not shown) and an exposure control system housing 14. The exposure control system housing 14 is connected to the back portion 12 by means of a central portion 16 which is configured to define a lighttight exposure chamber housing. An objective lens assembly 18 which is disposed within a forward wall portion 20 of the exposure control system housing 14 functions to transmit light from a subject through the exposure chamber defined by the central portion 16 to properly expose a film unit within the back portion 12. The camera 10 is further provided with a viewfinder assembly 22 secured to a top wall portion 24 of the exposure chamber housing 16, and a shutter actuator button 26 for initiating a photographic exposure (in a well-known manner) is secured partially within the exposure control system housing 14 and extends upward through a top wall portion 28 of said housing 14 to be accessible to a user.

Figure 2:
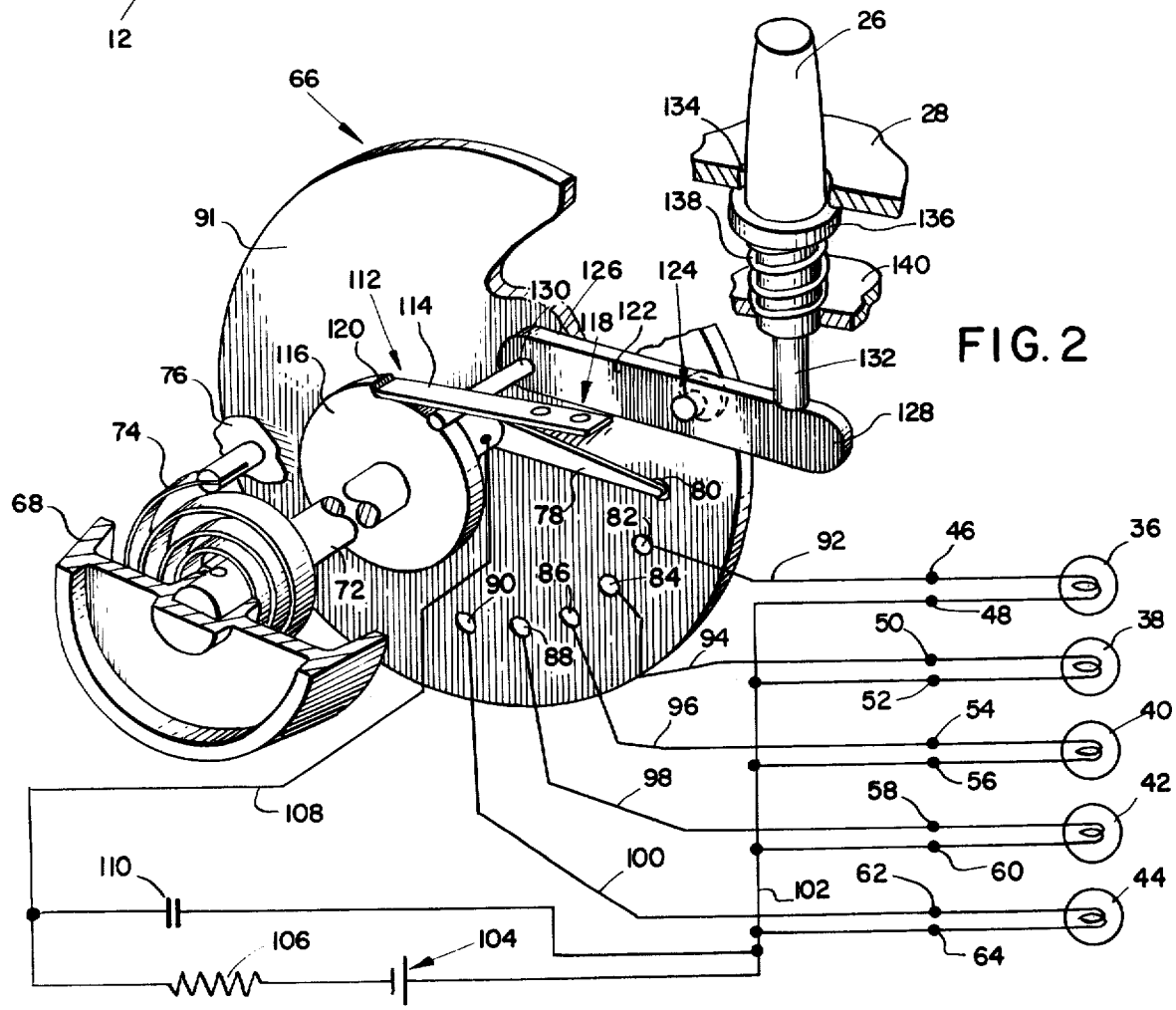
FIG. 2 provides a diagrammatic exploded perspective of the novel flash selection system of the subject invention.

A Flash-Bar 30 such as is manufactured by the General Electric Company and readily available throughout the United States is shown secured to a side wall 32 of the housing 14 via a socket assembly 34 which releasably retains the Flash-Bar 30 is a conventional and well-known manner. As best seen in FIG. 1, and as is commonly known, a plurality of flash lamps 36, 38, 40, 42, and 44 are disposed in a linear array within the Flash-Bar 30, and as schematically illustrated in FIG. 2, each of the flash lamps 36, 38, 40, 42, and 44 are provided with a pair of input terminals 46 and 48, 50 and 52, 54 and 56, 58 and 60, and 62 and 64, respectively.

The novel flash selection system of the subject invention is illustrated generally at 66 and is seen to include a control knob 68 positioned outward of a side wall portion 70 of the exposure chamber housing 16 and which is secured to one end portion of a shaft 72 in a well-known manner. The shaft 72 extends through the side wall 70 and its end portion adjacent the control knob 68 is secured to one end portion of a spring motor 74, the other end portion of which is fixedly secured within the exposure chamber housing 16 in a well-known manner, as at 76. The end portion of the shaft 72 remote from the control knob 68 is fixedly secured to an electrically conductive wiper arm 78 in a well-known manner and the wiper arm 78 extends radially outward from the shaft 72 and is rotatable therewith.

A plurality of electrical contacts 80, 82, 84, 86, 88, and 90 are secured to a circular insulating plate 91 and are radially disposed about the shaft 72 in a well-known manner so as to lie along a segment of a circle whose radius is approximately equal to the length of the conductive wiper arm 78. The electrical contacts 82, 84, 86, 88, and 90 are connected via the conductive paths 92, 94, 96, 98, and 100, respectively, to the input terminals 46, 50, 54, 58, and 62, respectively, of the flash lamps.

Before proceeding, it should be noted that the wiper arm 78, the contacts 80 through 90, and the conductive paths 92 through 100 may be disposed within or without the photographic camera 10 in any conventional manner and for convenience and aesthetic reasons in the embodiment illustrated in FIG. 1 are disposed within the photographic camera 10. Furthermore, it will be noted that there is no conductive path between the contact terminal 80 and any of the input terminals to the flash lamps 36 through 44. As will be more apparent, infra, the contact terminal 80 serves as a standby terminal for the initiation and termination of the lamp selection process.

As best seen in FIG. 2, each of the input terminals 48, 52, 56, 60, and 64 of the flash lamps 36, 38, 40, 42, and 44, respectively, are connected to a common conductive path 102. The negative terminal of a battery 104 is connected to the common conductive path 102 while the positive terminal of the battery 104 is connected to one end of a resistor 106. The other end of the resistor 106 is connected via a conductive path 108 to the end of the electrically conductive wiper arm 78 fixed to the shaft 72 as by a brush and ring assembly (not shown) in a conventional manner. A capacitor 110 is connected across the serial combination of the battery 104 and the resistor 106 so as to extend between the conductive path 102 and the conductive path 108.

The flash selection system 66 is initially in the position shown in FIG. 2 with the wiper arm 78 in contact with the standby electrical contact 80 and is releasably stored in this position by means of a pawl and ratchet assembly 112 which is seen to include a cantilevered spring member 114 and a ratchet wheel 116. One end portion of the cantilevered spring member 114 is fixedly secured within the exposure chamber housing 16 as at 118 in a well-known manner, while the other end portion of the spring member 114 abuts a single arcuate tooth 120 which extends above the periphery of the ratchet wheel 116. A control lever 122 is pivotally secured within the exposure chamber housing 16 as at 124 and extends to opposite end portions 126 and 128, respectively. A pin 130 is fixedly secured to the end portion 126 of the control lever 122 and extends under the cantilevered spring member 114 so as to just contact same in the position shown.

It will be recalled that the shutter actuator button 26 extends partially within the exposure control system housing 14 and as best seen in FIG. 2 the shutter release button 26 extends to an elongated end portion 132 which engages the end portion 128 of the control lever 122. The shutter release button 26 extends through an aperture 134 in said housing 14 and is secured within said housing 14 by means of a collar 136 and a coil spring 138. The coil spring 138 is disposed about the central portion of the shutter release button and extends between the collar 136 and a frame member 140 secured within the housing 14 and is preloaded so as to urge the collar 136 (which is of a diameter larger than that of the aperture 134) into abutment with the inner face of the top wall 28.

Considering the operation of the subject invention in more detail, it will be assumed that the mechanism is in position as shown in FIG. 2 with the wiper arm 78 contacting the standby contact 80 and with the capacitor 110 fully charged by the battery 104. Assume now that the user has properly framed his subject in the viewfinder 22 and has determined to initiate an exposure. Assume further that one or more of the flash lamps 36, 38, 40, 42, and 44 are inoperative.

To commence an exposure, the user will depress the shutter release button 26 which will pivot the control lever 122 as the elongated end portion 132 of the release button 26 pushes downward on the end portion 128 of the control lever 122. Such clockwise movement of the control lever 122 will cause the pin member 130 extending from the end portion 126 thereof to lift the cantilevered spring 114 clear of the tooth 120 of the ratchet wheel 116, thus freeing the wheel and the shaft 72 secured thereto to rotate in a clockwise direction (looking into FIG. 2) under the influence of the spring motor 74. As the spring motor 72 begins to unwind driving the shaft 72 and the ratchet wheel 116 in a clockwise direction, the user will have released the button 26 which will be returned to its uppermost position by the coil spring 138. The upward movement of the shutter release button 26 will cause its elongated end portion 132 to permit the control lever 122 to pivot in a counterclockwise direction under the influence of the cantilevered spring 114 in abutment with the pin 130 and such counterclockwise movement of the control lever 122 will permit the end portion of the cantilevered spring 114 to contact the periphery of the ratchet wheel 116 and again engage the tooth 120 when the ratchet wheel 116 and the shaft 72 have completed one revolution.

Thus, upon the momentary depression of the shutter release button 26, the wiper arm 78 will be caused to rotate in a clockwise direction with the shaft 72 starting from the standby contact 80 sequentially engaging the contacts 82, 84, 86, 88, and 90 and finally returning to the standby contact 80. Until such time as the wiper arm 78 engages one of the electrical contacts 82 through 90 associated with an operative flash lamp, the discharge path of the capacitor 110 will remain open-circuited. At such time as the wiper arm 78 engages one of said contacts 82 through 90 associated with an operative one of said flash lamps 36 through 44 the discharge path of the capacitor 110 will be completed and the capacitor will discharge through the operative flash lamp to properly ignite same.

Should the wiper arm 78 move on to an electrical contact associated with another operative flash lamp during its cycle, after once successfully igniting an operative flash lamp, the capacitor will not have had a chance to recharge and will be unable to successfully ignite such a flash lamp. Furthermore, the resistor 106 serially connected with the battery 104 will insure a sufficient potential drop so that the battery itself will be unable to ignite a second comparative flash lamp encountered during a single cycle of the wiper arm 78. The inability of the flash selection system 66 to cause a successful ignition of more than one of the flash lamps 36 through 44 during a single cycle is insured by selecting the duration of contact between the wiper arm 78 and the contacts 82 through 90 and the duration of the cycle of the wiper arm 78 such that there will be insufficient time for the capacitor 110 to recharge itself during the cycle of the wiper arm 78 after the successful firing of a single flash lamp.

Typically, it may be desired to configure the flash selection system 66 such that the time of engagement between the wiper arm 78 and any of the contacts 82 through 90 is approximately 3 milliseconds and the time between successive engagement between the wiper arm 78 and the contacts 82 through 90 is less than approximately 100 milliseconds. With switching times as aforesaid, the battery 104 may typically provide approximately 1.5 volts, the resistor 106 may be approximately 2,500 ohms, and the capacitor 110 may be approximately 2,000 mfd.

Thus, it is seen that the flash selection system 66 will select and ignite only a single operative one of the flash lamps 36 through 44 in response to a momentary depression of the shutter release button 26. Accordingly, only one flash lamp will be ignited during each photographic cycle (which, of course, is initiated by the depression of the shutter button 26 in a well-known manner) and as long as one of the flash lamps 36 through 44 is operative, it will be selected and properly ignited so that a photographic cycle will not be aborted due to the presence of an inoperative flash lamp.

It should be noted that the spring motor 74 may be so designed as to store sufficient energy for only a single photographic cycle or for multiple photographic cycles. In any event, there will come a time such that when the wiper arm 78 has completed a cycle and come to rest at the standby contact 80, insufficient energy will remain stored in the spring motor to cause the wiper arm 78 to sweep the contacts 82, 84, 86, 88, and 90 and return to its standby position. At this time, it is merely necessary for the user to rotate the control knob 68 in a counterclockwise direction a sufficient number of full turns to store the necessary driving energy for the system. To avoid undesired lamp ignition, either the array of lamps 30 must be withdrawn from the socket assembly 34 or an auxiliary switch (not shown) must be provided to disconnect the battery.

It will be recalled that the pawl and ratchet assembly 112 includes a cantilevered spring member 114 and it should be noted that this spring member 114 will resiliently ride over the periphery of the ratchet wheel 116 during counterclockwise rotation of the control knob 68 but prevent clockwise rotation of the ratchet wheel 116, and hence the shaft 72, by engaging the face of the single arcuate tooth 120. Accordingly, the user will be free to wind up the system 66 while the shaft 72 and its associated components will be free to unwind at the appropriate time.

It can readily be seen that many variations and modifications of the present invention are possible in the light of the aforementioned teachings, and it will be apparent to those skilled in the art that various changes in form and in arrangement of components may be made to suit requirements without departing from the spirit and scope of the invention. It is, therefore, to be understood that within the scope of the appended claims the instant invention may be practised in a manner otherwise than is specifically described herein.

What is claimed is:

1. A photographic camera operable in conjunction with an array of flash lamps and a power supply for effecting artificially illuminated photographic exposures, including:

means connected to said camera for releasably receiving said array and electrically contacting said lamps;

means connected to said camera for initiating a photographic exposure cycle; and means connected to said initiating means for sequentially connecting said power supply to discrete ones of said lamps in said array via said contacting means during a single exposure cycle at least until one of said lamps is ignited.

2. The invention pursuant to claim 1, wherein said sequentially connecting means is actuable from an initial condition by said initiating means and further including means for resetting said sequentially connecting means to said initial condition.

3. The invention pursuant to claim 2, further including means for at least temporarily disabling said power supply from igniting one of said flash lamps.

4. The invention as set forth in claim 3, wherein said disabling means includes means for reducing the output potential of said power supply to a level insufficient to ignite a flash lamp.

5. The invention as delineated in claim 4, wherein said sequentially connecting means includes a plurality of electrical contacts each connected to one of said flash lamps via said releasably receiving means and switching means for sequentially engaging said electrical contacts.

6. The invention according to claim 5, wherein said switching means sequentially engages each of said plurality of electrical contacts during each of said exposure cycles.

7. The invention pursuant to claim 6, wherein said power supply is disabled after the ignition of a flash lamp at least until said switching means has engaged and disengaged all of said plurality of electrical contacts.

8. The invention as set forth in claim 7, further including means for automatically engaging said switching means with each of said plurality of electrical contacts in response to a single actuation of said initiating means.

9. The invention as stated in claim 8, wherein said power supply includes first energy storage means and second energy storage means connected to said switching means for receiving and storing energy from said first energy storage means.

10. The invention as recited in claim 9, further including means for regulating the time for charging said second energy storage means from said first energy storage means.

11. The invention as set forth in claim 10, further including a standby contact and wherein said switching means is in engagement with said standby contact when said sequentially engaging means is in said initial condition.

12. The invention as described in claim 11, wherein said first energy storage means comprises a battery, said second energy storage means comprises a capacitor, and said time regulating means comprises a resistor serially connected with said battery; said capacitor being connected in electrical parallelism across said battery and said resistor.

13. The invention as recited in claim 12, wherein each of said lamps includes two input terminals and one such terminal of each lamp is electrically connected to a discrete contact and the other such terminal of each lamp is connected to one side of said battery upon insertion of said array into said releasably receiving means.

14. The invention as delineated in claim 5, wherein said switching means includes a shaft rotatably secured to said camera and conductive means connected to said shaft and extending radially therefrom to sequentially engage said contacts in response to the rotation of the shaft.

15. The invention as recited in claim 14, further including motor means connected to said shaft for effecting the rotation thereof and means for securing said shaft in an initial position corresponding to said initial condition.

16. The invention pursuant to claim 15, wherein said initial position securing means includes a ratchet wheel connected to said shaft and rotatable therewith and pawl means movable from a position engaging and restraining said ratchet wheel to a position out of engagement therewith in response to actuation of said initiating means whereby said shaft may be rotated by said motor means.

17. The invention as defined in claim 16, further including means for automatically returning said pawl means into engagement with said ratchet wheel subsequent to the actuation of said initiating means to releasably secure said shaft and said ratchet wheel in said initial position upon their return thereto.

18. The invention as delineated in claim 17, wherein said motor means comprises a spring motor and said resetting means includes means for winding up said spring motor.

19. The invention as delineated in claim 8, wherein said switching means includes a shaft rotatably secured to said camera and conductive means connected to said shaft and extending radially therefrom to sequentially engage said contacts in response to the rotation of said shaft.

20. The invention as recited in claim 8, further including a shaft; motor means connected to said shaft for effecting the rotation thereof and means for securing said shaft in an initial position corresponding to said initial condition.

21. The invention pursuant to claim 20, wherein said initial position securing means includes a ratchet wheel connected to said shaft and rotatable therewith and pawl means movable from a position engaging and restraining said ratchet wheel to a position out of engagement therewith in response to actuation of said initiating means whereby said shaft may be rotated by said motor means.

22. The invention defined in claim 21, further including means for automatically returning said pawl means into engagement with said ratchet wheel subsequent to the actuation of said initiating means to releasably secure said shaft and said ratchet wheel in said initial position upon their return thereto.

23. The invention as delineated in claim 22, wherein said motor means comprises a spring motor and said resetting means includes means for winding up said spring motor.

24. Means for use with a power supply and a photographic camera, having photographic exposure initiating means, for sequentially and automatically selecting operative flash lamps from an array of operative and inoperative lamps whereby successful photographic exposures may be insured, including:
means for electrically contacting each of the lamps in said array; and
means connectable to said initiating means for sequentially connecting said power supply to discrete ones of said lamps in said array via said contacting means during a single exposure cycle of said camera at least until one of said lamps is ignited.

25. The invention pursuant to claim 24, wherein said sequentially connecting means is actuable from an initial condition by said initiating means and further including means for resetting said sequentially connecting means to said initial condition.

26. The invention pursuant to claim 24, further including means for at least temporarily disabling said power supply from igniting one of said flash lamps.

27. The invention as set forth in claim 26, wherein said disabling means includes means for reducing the output potential of said power supply to a level insufficient to ignite a flash lamp.

28. The invention as delineated in claim 27, wherein said sequentially connecting means includes a plurality of electrical contacts each connected to one of said flash lamps via said electrically contacting means and switching means for sequentially engaging said electrical contacts.

29. The invention according to claim 28, wherein said switching means sequentially engages each of said plurality of electrical contacts during each of said exposure cycles.

30. The invention pursuant to claim 29, wherein said power supply is disabled after the ignition of a flash lamp at least until said switching means has engaged and disengaged all of said plurality of electrical contacts.

31. The invention as set forth in claim 30, further including means for automatically engaging said switching means with each of said plurality of electrical contacts in response to a single actuation of said initiating means.

32. The invention as stated in claim 31, wherein said power supply includes first energy storage means and second energy storage means connected to said switching means for receiving and storing energy from said first energy storage means.

33. The invention as recited in claim 32, further including means for regulating the time for charging said second energy storage means from said first energy storage means.

34. The invention as set forth in claim 33, further including a standby contact and wherein said switching means is in engagement with said standby contact when said sequentially engaging means is in said initial condition.

35. The invention as described in claim 34, wherein said first energy storage means comprises a battery, said second energy storage means comprises a capacitor, and said time regulating means comprises a resistor serially connected with said battery; said capacitor being connected in electrical parallelism across said battery and said resistor.

36. The invention as recited in claim 35, wherein each of said lamps includes two input terminals and one such terminal of each lamp is electrically connected to a discrete contact and the other such terminal of each lamp is connected to one side of said battery.

37. The invention as delineated in claim 28, wherein said switching means includes a shaft rotatably secured to said camera and conductive means connected to said shaft and extending radially therefrom to sequentially engage said contacts in response to the rotation of said shaft.

38. The invention as recited in claim 37, further including motor means connected to said shaft for effecting the rotation thereof and means for securing said shaft in an initial position corresponding to said initial condition.

39. The invention pursuant to claim 38, wherein said initial position securing means includes a ratchet wheel connected to said shaft and rotatable therewith and pawl means movable from a position engaging and restraining said ratchet wheel to a position out of engagement therewith in response to actuation of said initiating means whereby said shaft may be rotated by said motor means.

40. The invention as defined in claim 39, further including means for automatically returning said pawl means into engagement with said ratchet wheel subsequent to the actuation of said initiating means to releasably secure said shaft and said ratchet wheel in said initial position upon their return thereto.

41. The invention as delineated in claim 40, wherein said motor means comprises a spring motor and said resetting means includes for winding up said spring motor.

42. A photographic camera operable in conjunction with an array of flash lamps for effecting artificially illuminated photographic exposures, the array of flash lamps including a pair of input terminals in electrical communication with each flash lamp thereof, said camera comprising:

means for initiating a photographic exposure cycle;
means for mounting the array of flash lamps and a source of electrical energy; and
means for firing the flash lamps in a predetermined sequence with one flash lamp only being fired responsive to each operation of said exposure cycle initiating means, said firing means including:
means for sequentially coupling each pair of the input terminals to the source of electrical energy to facilitate the sequential firing of the flash lamps, said sequentially coupling means including a displaceably mounted electrical contact member arranged to sequentially couple the source of electrical energy to the pairs of input terminals;
means responsive to the operation of said exposure cycle initiating means for rendering said sequentially coupling means operative; and
means responsive to the firing of each of the flash lamps for rendering said sequentially coupling means inoperative to effect the firing of the next unfired flash lamp, whereby each operation of said exposure cycle initiating means will effect only the firing of the first unfired flash lamp in the array and the next operation of said exposure cycle initiating means will effect the firing of the next unfired flash lamp in the array.

43. The camera of claim 42, wherein said sequentially coupling means additionally includes means defining an electrically conductive path between the source of electrical energy and a first one of each of the pairs of input terminals, a plurality of electrical contacts, means defining discrete electrically conductive paths between respective ones of said electrical contacts and the second one of each of the pairs of input terminals, means defining an electrically conductive path between said electrical contact member and the source of electrical energy, a capacitor, means for electrically coupling said capacitor to both the source of electrical energy for charging thereby and across said first mentioned and said third mentioned electrically conductive path defining means and means for effecting the displacement of said electrical contact member into sequential engagement with said plurality of electrical contacts.

44. A photographic camera operable in conjunction with an array of flash lamps for effecting artificially illuminated photographic exposures, the array of flash lamps including a pair of input terminals in electrical communication with each flash lamp thereof, said camera comprising:

means for initiating a photographic exposure cycle;
means for mounting the array of flash lamps and a source of electrical energy; and
means for firing the flash lamps in a predetermined sequence with one flash lamp only being fired responsive to each operation of said exposure cycle initiating means, said firing means including:
means for sequentially coupling each pair of the input terminals to the source of electrical energy to facilitate the sequential firing of the flash lamps, said sequentially coupling means including means defining an electrically conductive path between the source of electrical energy and a first one of each of the pairs of input terminals, a plurality of electrical contacts, means defining discrete electrical conductive paths between respective ones of said electrical contacts and the second one of each of the pairs of input terminals, an electrical contact member mounted for displacement along a given path wherein it sequentially engages said electrical contacts, means defining an electrically conducted path between said electrical contact member and the source of electrical energy and means for effecting the displacement of said electrical contact member along said given path;
means responsive to the operation of said exposure cycle initiating means for rendering said sequentially coupling means operative; and means responsive to the firing of each of the flash lamps for rendering said sequentially coupling means inoperative to effect the firing of the next unfired flash lamp, whereby each operation of said exposure cycle initiating means will effect only the firing of the first unfired flash lamp in the array and the next operation of said exposure cycle initiating means will effect the firing of the next unfired flash lamp in the array.

* * * * *